United States Patent
Newstadt et al.

(10) Patent No.: US 7,805,752 B2
(45) Date of Patent: Sep. 28, 2010

(54) DYNAMIC ENDPOINT COMPLIANCE POLICY CONFIGURATION

(75) Inventors: Keith Newstadt, Newton, MA (US); Tim Brown, Ballston Spa, NY (US)

(73) Assignee: Symantec Corporation, Mountain View, CA (US)

( * ) Notice: Subject to any disclaimer, the term of this patent is extended or adjusted under 35 U.S.C. 154(b) by 1008 days.

(21) Appl. No.: 11/270,918

(22) Filed: Nov. 9, 2005

(65) Prior Publication Data

US 2007/0107043 A1    May 10, 2007

(51) Int. Cl.
*G06F 17/00* (2006.01)
(52) U.S. Cl. .......................................................... 726/1
(58) Field of Classification Search ........................ None
See application file for complete search history.

(56) References Cited

U.S. PATENT DOCUMENTS

| | | | |
|---|---|---|---|
| 5,987,524 | A | 11/1999 | Yoshida et al. |
| 6,073,242 | A * | 6/2000 | Hardy et al. ............... 726/1 |
| 6,393,484 | B1 | 5/2002 | Massarani |
| 6,490,493 | B1 | 12/2002 | Dharnipragada |
| 6,490,679 | B1 * | 12/2002 | Tumblin et al. ............. 713/155 |
| 6,499,110 | B1 * | 12/2002 | Moses et al. ............... 726/1 |
| 6,789,215 | B1 | 9/2004 | Rupp et al. |
| 6,993,785 | B1 | 1/2006 | Na |
| 7,020,573 | B2 | 3/2006 | Wheeler et al. |
| 7,185,359 | B2 * | 2/2007 | Schmidt et al. ............. 726/2 |
| 7,240,368 | B1 | 7/2007 | Roesch et al. |
| 7,308,712 | B2 | 12/2007 | Banzhof |
| 7,337,224 | B1 * | 2/2008 | Van Horne et al. .......... 709/225 |
| 7,360,237 | B2 * | 4/2008 | Engle et al. ............... 726/1 |
| 7,424,384 | B2 | 9/2008 | Wheeler et al. |
| 7,472,422 | B1 | 12/2008 | Agbabian |
| 7,509,676 | B2 | 3/2009 | Trueba |
| 2002/0025031 | A1 | 2/2002 | Maeda et al. |
| 2002/0042832 | A1 | 4/2002 | Fallentine et al. |
| 2002/0078377 | A1 | 6/2002 | Chang et al. |
| 2002/0162017 | A1 | 10/2002 | Sorkin et al. |
| 2003/0154394 | A1 | 8/2003 | Levin |
| 2004/0139227 | A1 | 7/2004 | Takeda |
| 2005/0005129 | A1 | 1/2005 | Oliphant |
| 2005/0188268 | A1 | 8/2005 | Verbowski et al. |

(Continued)

OTHER PUBLICATIONS

U.S. Appl. No. 10/895,780, and art cited therein, filed Jul. 20, 2004 (not yet publicly available), Greg D. Vogel.

(Continued)

*Primary Examiner*—Kambiz Zand
*Assistant Examiner*—Teshome Hailu
(74) *Attorney, Agent, or Firm*—Fenwick & West LLP

(57) ABSTRACT

Techniques are disclosed for implementing dynamic endpoint compliance policy configuration. In one embodiment, a security service is provided that automates endpoint compliance policy configuration. A customer identifies its deployed client security products, and specifies the desired level of security. This security product and level information is used by the security service to generate endpoint compliance policies tailored to that customer's current network and/or security scheme. The security service can incorporate data obtained from early warning services that deliver timely and actionable security alerts into its policy generation process. In this way, the security service can provide endpoint compliance policies that protect its customers' machines from the very latest threats at any moment in time.

15 Claims, 4 Drawing Sheets

U.S. PATENT DOCUMENTS

| | | | |
|---|---|---|---|
| 2005/0216957 | A1 | 9/2005 | Banzhof et al. |
| 2005/0229256 | A2 | 10/2005 | Banzhof |
| 2005/0246767 | A1 | 11/2005 | Fazal et al. |
| 2005/0262086 | A1 | 11/2005 | Ta et al. |
| 2005/0278775 | A1 | 12/2005 | Ross |
| 2006/0015722 | A1 | 1/2006 | Rowan et al. |
| 2006/0101520 | A1 | 5/2006 | Schumaker et al. |
| 2006/0230437 | A1* | 10/2006 | Alexander Boyer et al. .... 726/4 |
| 2006/0259960 | A1* | 11/2006 | Kondo ......................... 726/6 |
| 2007/0101405 | A1 | 5/2007 | Engle et al. |
| 2007/0143851 | A1 | 6/2007 | Nicodemus et al. |

OTHER PUBLICATIONS

"BigFix® Announces Support for Network Access Protection Technology from Microsoft," BigFix, Inc., Jul. 13, 2004, [online] [Retrieved on Mar. 31, 2006] Retrieved from the Internet<URL:http://www.bigfix.com/press/news/pr_071304.html>.

BigFix Client Compliance: Cisco NAC, BigFix, Inc., Apr. 25, 2005, [online] [Retrieved on Mar. 31, 2006] Retrieved from the Internet<URL:http://www.satisnet.co.uk/downloads/bigfix/bigfix_cisco_nac.pdf>.

"BigFix® Closes the "Scan & Block" Remediation Gap with Expanded Endpoint Security Offerings," BigFix, Inc., Oct. 7, 2004, [online] [Retrieved on Mar. 31, 2006] Retrieved from the Internet<URL:http://www.bigfix.com/press/news/pr_100704.html>.

Walder, Bob, "Intrusion Detection Systems," TechOnLine, 1996-2006, [online] [Retrieved on Mar. 31, 2006] Retrieved from the InternetURL:http://www.techonline.com/community/ed_resource/feature_article/20645>.

Langston, R., "Network Access Control Technologies and Sygate Compliance on Contact," Sygate Technologies, Inc., 2005, [online] [Retrieved on Jul. 31, 2006] Retrieved from the Internet<URL:http://www.softwarespectrum.com/symantec/docs/WP-Sygate-Network-Access-Control.pdf>.

* cited by examiner

DYNAMIC ENDPOINT COMPLIANCE POLICY CONFIGURATION

RELATED APPLICATIONS

This application is related to U.S. application Ser. No. 10/305,622, filed Nov. 27, 2002, titled "Enforcement of Compliance with Network Security Policies." This application is also related to U.S. application Ser. No. 11/271,656, filed Nov. 9, 2005, titled "Enhanced Client Compliancy Using Database of Security Sensor Data". This application is also related to U.S. application Ser. No. 11/271,610, filed Nov. 9, 2005, titled "Client Compliancy in a NAT Environment". Each of these applications is herein incorporated in its entirety by reference.

FIELD OF THE INVENTION

The invention relates to client compliancy, and more particularly, to techniques for automating endpoint compliance policy configuration in a client compliancy system.

BACKGROUND OF THE INVENTION

A client compliancy system is used to gate access to a protected network, such that only clients that are in compliance with a policy are allowed access to the protected network. Clients that are not in compliance are typically assigned to a quarantine network and provided with some remediation mechanism that should allow them to become compliant. Determination of a client's compliance can be done on the client itself, external to the client, or in combination.

Endpoint compliance solutions help customers manage client security by ensuring that all clients are using current signatures, components, patches, and security policy. However, the endpoint compliance solution itself requires management. In particular, the customer must define and configure the required compliance policies. This configuration process is ongoing and difficult, particularly as more client security products are deployed, and as those products are updated. Further, as vulnerabilities are discovered and new viruses are unleashed, the definition of "compliant" can change in real-time. Current endpoint compliance solutions rely on a static definition of client security policy.

What is needed, therefore, are techniques for implementing a dynamic endpoint compliance policy configuration.

SUMMARY OF THE INVENTION

One embodiment of the present invention provides a method for automated endpoint compliance policy configuration. The method includes receiving security product and desired security level data for an endpoint environment of a customer. The method continues with receiving a request for endpoint compliance policies for that endpoint environment, and generating one or more endpoint compliance policies tailored to the endpoint environment, based on the security product and desired security level data. The method continues with sending the one or more tailored endpoint compliance policies to the endpoint environment. The method may further include receiving alert data indicative of one or more current security alerts from an early warning security alert service, wherein generated endpoint compliance policies are further based on the alert data. In one particular embodiment, generating one or more endpoint compliance policies tailored to the endpoint environment includes accessing a database of endpoint compliance policies categorized by product and security level. Receiving security product and desired security level data may occur, for example, at least one of contemporaneously with or in advance of receiving the request. The security product and desired security level data may be, for example, provided by a customer. Alternatively, or in addition to, the security product and desired security level data may be determined automatically by scanning the host device for products for which policies can be provided, and then at least one of assigning default security levels, recommending security levels, and allowing the customer to specify the security levels for the identified products. In another particular embodiment, receiving the security product and desired security level data, receiving the request, generating one or more endpoint compliance policies, and sending the one or more tailored endpoint compliance policies are carried out at a location remote from the endpoint environment. In this particular case, the method may further include at the endpoint environment uploading the security product and desired security level data to the remote location, requesting endpoint compliance policies from the remote location, and receiving the endpoint compliance policies tailored to the endpoint environment from the remote location. The method may further include at the endpoint environment at least one of determining endpoint compliance status based on the endpoint compliance policies tailored to the endpoint environment, and enforcing appropriate traffic control based on compliance status.

Another embodiment of the present invention provides a machine-readable medium (e.g., compact disk, diskette, server, memory stick, or hard drive) encoded with instructions, that when executed by a processor, cause the processor to carry out a process for automated endpoint compliance policy configuration. This process can be, for example, similar to or a variation of the previously described method.

Another embodiment of the present invention provides a system for automated endpoint compliance policy configuration. The system includes a server for receiving security product and desired security level data from an endpoint environment of a customer, and receiving a request for endpoint compliance policies for that endpoint environment. The system further includes a customized endpoint compliance policy generator for generating one or more endpoint compliance policies tailored to the endpoint environment, based on the security product and desired security level data. The server is further configured for sending the one or more tailored endpoint compliance policies to the endpoint environment. The customized endpoint compliance policy generator may be further configured for receiving alert data indicative of one or more current security alerts from an early warning security alert service, wherein generated endpoint compliance policies are further based on the alert data. In one particular embodiment, the customized endpoint compliance policy generator generates the one or more endpoint compliance policies tailored to the endpoint environment by accessing a database of endpoint compliance policies categorized by product and security level. The security product and desired security level data may be, for example, provided by a customer. Alternatively, or in addition to, the security product and desired security level data may be determined automatically by scanning the host device for products for which policies can be provided, and then at least one of assigning default security levels, recommending security levels, and allowing the customer to specify the security levels for the identified products. The system may include at the endpoint environment a security level and product reporter module for obtaining the security product and desired security level data, and a compliance policy requestor module for uploading the security product and desired security level data to the server, requesting endpoint compliance policies from the server, and receiving endpoint compliance policies tailored to the endpoint environment from the server. The system may further include at the endpoint environment at least one of a compliance determination module for determining endpoint compliance status based on the endpoint compliance policies tailored to the endpoint environment, and a remediation module for enforcing appropriate traffic control based on compliance status.

The system functionality can be implemented, for example, in software (e.g., executable instructions encoded on one or more computer-readable mediums), hardware (e.g., gate level logic), firmware (e.g., one or more microcontrollers with embedded routines), or some combination thereof, or other suitable means. Further note that the system may include functionality, for example, at a security service location, a customer location, or both locations.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Techniques are disclosed for implementing dynamic endpoint compliance policy configuration. Such endpoint compliance solutions are easy to deploy and maintain, relative to conventional endpoint compliance solutions, in that up-to-date compliance policies are selected based on supported client security products at the customer site. These custom tailored endpoint compliance policies can then be served to the corresponding endpoint or endpoints.

General Overview

In one embodiment, a security service is provided that automates endpoint compliance policy configuration. The security service incorporates real-time threat data obtained from one or more security information services (e.g., Symantec DeepSight Alert Service and other such early warning services that deliver timely and actionable security alerts) into its policy generation process. In this way, the security service can provide endpoint compliance policies that protect its customers' machines from the very latest threats at any moment in time.

In addition, the endpoint compliance solution provided by the security service is tailored to the current state of network security at each customer's site. In one particular case, each customer identifies the client security products deployed at its site, and specifies the desired level of security. This security product and level information is uploaded or otherwise provided to the security service. Thus, policies generated by the security service in response to a particular customer are tailored to that customer's current network and/or security scheme, and can then be downloaded or otherwise provided to its customers. Compliance policy validation can then be provided at the customer site, or in terms of the Trusted Network Connect (TNC) specification, at each policy decision point (PDP). The TNC specification is herein incorporated in its entirety by reference.

Given the incorporation of security information services, the security service ensures that compliance policy is correctly and securely defined at any given time, even as new component versions and patches are released, and as new threats are introduced in the wild. The result is an endpoint compliance product that requires little effort and knowledge to deploy, requires even less to maintain, and provides the most secure and up-to-date compliance policy possible. Note that embodiments of the present invention can be configured at the customer site, at the security service site, or at both the customer and security service sites.

System Architecture

Figure 1:
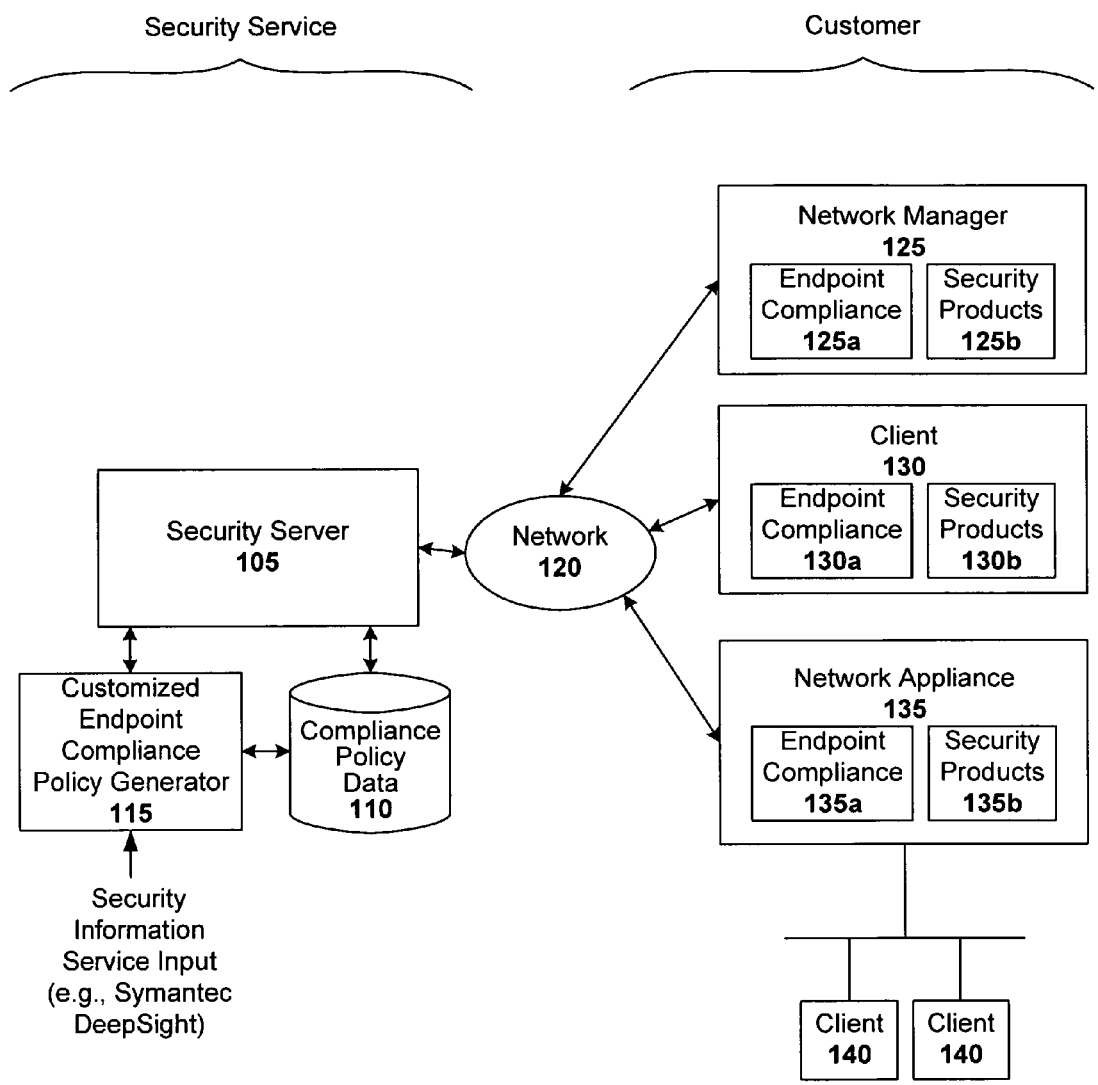
FIG. 1 is a block diagram of a client compliancy system configured with automated endpoint compliance policy configuration in accordance with an embodiment of the present invention.

FIG. 1 is a block diagram of a client compliancy system configured with automated endpoint compliance policy configuration in accordance with an embodiment of the present invention.

As can be seen, the system includes a security service and one or more customers (in this example, only one customer site is shown). The security service includes a security server 105, a compliance policy data module 110, and a customized endpoint compliance policy generator module 115. The security service is communicatively coupled via network 120 to the customer, which in this example embodiment includes a network manager 125, a client 130, and a network appliance 135 coupled to an internal network that includes a number of clients 140. Although the discussion herein focuses on endpoint compliance policy configuration, other compliance system attributes, such as detection of malicious code/activity and remedial capability, will be apparent in light of this disclosure.

The network 120 may be any type of communications network, such as a local area network (e.g., intranet), wide area network (e.g., Internet), or some combination thereof. Alternatively, the network 120 may be a direct connection between the customer and the security service. In general, communication between the security service and the customer can be implemented via any type of wired and/or wireless connection, using a wide variety of communication protocols (e.g., TCP/IP, HTTP, SMTP, FTP), encodings or formats (e.g., HTML, XML), and protection schemes (e.g., VPN, secure HTTP, SSL). Alternatively, the security service may indirectly communicate with its customers via U.S. mail or other such delivery service, where a processor readable medium (e.g., compact disk or floppy disk) is sent to a customer's street address. This processor readable medium can be encoded with instructions and/or data files that can be loaded, executed and/or otherwise used by the clients and/or network devices at the customer's site.

The security server 105 is provided by a security software vender or other entity, and can include one or more standard computer systems configured to communicate with client computers (network manager 125, client 130, and network appliance 135) via the network 120. For example, the security server 105 can include a web server, FTP server, or other technology that enables the security server 105 to interact with the customer devices via the network 120. The security server 105 may also provide to clients 214, for example, signatures and security code for detecting malicious software and activity. In addition, the security server 105 can provide signatures of exclusions, which are programs, routines, applications, etc that are known to be legitimate in their purpose and operation, or are otherwise trusted.

In one embodiment, the security server 105 provides customized endpoint compliance policies tailored to the customer's needs, based on deployed security products and desired security level specified by the customer. The security server 105 can provide the customized endpoint compliance policies, for example, in response to requests from the customer and/or on a periodic basis (e.g., one every 4 hours or each time policies affecting that particular customer are updated). As can be seen in this embodiment, the customized endpoint compliance policies are generated by the customized endpoint compliance policy generator module 115, and stored in the compliance policy database 110. The server 105 can then access database 110 to retrieve policies that are relevant to a given customer. Alternatively, or in addition to, the server 105 can receive policies directly from the module 115. In any case, the customized endpoint compliance policies are served to the corresponding customer.

As previously explained, the customized endpoint compliance policy generator module 115 generates the custom-tailored endpoint compliance policies based on the client security products the customer has deployed. In one such embodiment, each endpoint compliance policy in the database 110 is named and categorized by the corresponding security product and the level of security it provides. Each endpoint compliance policy is configured to require the appropriate client security, based on the security service's recommendations.

Table 1 illustrates example structure and content of the compliance policy data module 110. This example compliance policy data module 110 is configured as a look-up table indexed by security product name and security level. For each security product and security level pair, there are one or more applicable policies that would apply to that particular product. Other data facilities and search techniques can be used as well, such as searchable linked lists and databases. Further, note that not all products are actually "security products" per se. For example, Norton Antivirus and Internet Security are generally known as security products. However, the Internet Explorer browser is an application for accessing the Internet, and happens to have various embedded security features or patches to protect its host system. Likewise, operating systems like those provided by Microsoft, Apple, or Linux have primary functions not directly related to security, but may also have features or patches to protect the host system. In addition, products such as word processing, spreadsheet, and presentation applications have a security aspect to them, in that those applications must be properly licensed and used in order to avoid liability under various intellectual property and contract laws. Thus, "security product name" as used herein is not intended to be limited to any one type of product, but is intended to cover any type of product that can be associated with one or more endpoint compliance policies set by the customer and/or the security service. In addition, note that policies can be used to exploit other opportunities, such as marketing opportunities (e.g., cross-selling related security products or upgrades), as well as to ensure implementation of a robust endpoint compliance security scheme.

TABLE 1

| Security Product Name | Security Level | Endpoint Compliance Policies |
| --- | --- | --- |
| Norton Antivirus 2004 | All | Launch at system start-up<br>Enable automatic update<br>Cross-sell Antivirus 2005 |
| Norton Antivirus 2005 | All | Launch at system start-up<br>Enable automatic update |
| Browser (IE) | Low | Maintain up-to-date security patches |
| Browser (IE) | Medium | Maintain up-to-date security patches<br>Enable pop-up blocker |
| Browser (IE) | High | Maintain up-to-date security patches<br>Enable pop-up blocker<br>Disable active scripting |
| Norton Internet Security 2005 | Low | Launch at system start-up<br>Enable automatic update for all enabled features |
| Norton Internet Security 2005 | Medium | Launch at system start-up<br>Enable automatic update<br>Enable Email Scanning for incoming/outgoing mail |
| Norton Internet Security 2005 | High | Launch at system start-up<br>Enable automatic update<br>Enable Email Scanning for incoming/outgoing mail<br>Enable firewall |
| Microsoft Operating System | All | Maintain up-to-date security patches |
| ZoneAlarm Firewall | Low | Launch at system start-up<br>Enable automatic update for all enabled features<br>Set program control to low |
| ZoneAlarm Firewall | Medium | Launch at system start-up<br>Enable automatic update for all enabled features<br>Set program control to medium<br>Stealth all ports to external network (Internet) |
| ZoneAlarm Firewall | High | Launch at system start-up<br>Enable automatic update for all enabled features<br>Set program control to high<br>Stealth all ports to external network (Internet) |
| Applications (word processor, spreadsheet, and presentation software) | All | Licensing must be current |

In the embodiment shown in FIG. 1, the security service also leverages existing security information services that deliver timely and actionable security alerts when generating compliance policies. In particular, the customized endpoint compliance policy generator module 115 receives security information service data, which is indicative of one or more current security alerts. Such early warning security alert data can be integrated (e.g., as it becomes available) into the known threats pool from which compliance policies are made. For example, if a new operating system or browser security patch has just been released, then a generated policy might require clients to have this patch installed. If a worm or other virus is quickly spreading through the Internet via a particular port, then customer firewalls can be required to have this port closed until the threat is under control. In addition, customer clients that may have been exposed to a current threat can be kept off the customer's internal or otherwise protected network, and can be encouraged to remediate by updating security components and local policy before being given access to the protected network. The security service, including server 105, compliance policy data module 110, and customized endpoint compliance policy generator module 115, will be discussed in more detail with reference to FIG. 4.

The customer's site may be configured in numerous ways. The particular configuration shown in FIG. 1 was selected to illustrate that the customer's site can be locally managed and/or monitored (e.g., network manager 125), and can have clients that are directly coupled to the network 120 (client 130), and/or indirectly coupled to the network 120 via a network appliance (e.g., network appliance 135 and clients 140). The network appliance 135 may be, for example, a firewall, hub, or router device. The network manager 125, client 130, and clients 140 can be any type of computer, such as a computer system (e.g., desktop/lap), personal data assistant (PDA), portable phone, smart phone, and/or any other digital device capable of communicating with devices over a network. Each of these customer devices may include any number of programs and functionality, such as an operating system and applications relevant to the customer's particular enterprise. Any number of clients and/or other network devices may be present at the customer site. Note that the customer site may also include a single machine communicatively coupled to the network 120 (e.g., such as in the case of a household having one computer connected to the Internet), or multiple machines coupled to the network 120 via a router (e.g., such as in the case of a small office or home network, which can be wired or wireless).

In this example configuration, the network manager 125, client 130, and network appliance 135 are each programmed or otherwise configured with an endpoint compliance module 125a, 130a, and 135a, respectively, and with one or more security products 125b, 130b, and 135b, respectively. Each of the security products 125b, 130b, and 135b may include any number of functionalities, such as antivirus, intrusion detection, security patch assessment, Internet security, firewall, file and/or email scanning, and quarantining capability. Some of the security products 125b, 130b, and 135b may also allow for storage of code signatures for comparison with suspect code to identify that code as either being malicious or excluded. Various other functionalities may be included in the security products 125b, 130b, and 135b, as will be apparent in light of this disclosure.

In one embodiment, the endpoint compliance modules 125a, 130a, and 135a are each configured to allow the user to specify the corresponding security products 125b, 130b, and 135b, respectively and the desired security level. This customer security information can then be uploaded or otherwise reported to the security service. For instance, the security product and level information can be included in each request for updated compliance policies. The endpoint compliance modules 125a, 130a, and 135a can also be configured to carryout an endpoint compliance scheme implemented with conventional or custom technology, including detection (e.g., intrusion and virus) and remedial capability (e.g., quarantine and upgrade client to be compliant with endpoint compliance policies). The security service can then provide custom endpoint compliance policies tailored to the security information provided by the customer. The endpoint compliance modules 125a, 130a, and 135a will be discussed in more detail with reference to FIGS. 2 and 3.

The network configuration of the customer site may also include other structure and components not shown in the example of FIG. 1. For instance, the customer network may include an authentication step such as 802.1X or DHCP proxies, where compliant devices (e.g., devices that are compliant with customized endpoint compliance policies tailored to the customer's needs by the security service) are assigned to a protected network and non-compliant devices (e.g., devices that are not compliant with customized endpoint compliance policies tailored to the customer's needs by the security service) are assigned to a restricted network. Examples of this type of structure and functionality are described in the previously incorporated applications, such as U.S. application Ser. No. 10/305,622.

The customize-tailored endpoint compliance policies provided by the security service can be rules-based, which allows them to be created and modified easily. These policies may include rules related to proper configuration of software on clients and network appliances at the customer's site (including enabling of particular features such as active scripting and specifying values for settings thereon), installation on customer devices of security software or other software programs (including anti-virus software and personal firewall software), updates for the security software or other software programs (including versions of the software and operating system security patches), and virus definitions. Additionally, the compliance policies can be configured to enforce software license agreements, where the compliance policies include rules related to installation on the customer devices of licensed software and available site licenses for the licensed software. Definitions for the compliance policies can be stored electronically for access by any system component that requires them. In the embodiment shown, the compliance policies are stored in (or are otherwise accessible to) the endpoint compliance modules 125a, 130a, and 135a. The network manager 125 can be responsible for requesting and updating the compliance policies for each of the customer devices. Alternatively, each device can be responsible for requesting and updating its own compliance policies.

In this particular example, the term "module" refers to computer program logic for providing the specified functionality. Note, however, that other modules configured in accordance with the principles of the present invention can be implemented in hardware (e.g., gate-level logic), firmware (e.g., microcontroller configured with I/O capability and a number of embedded routines for carrying out dynamic endpoint compliance policy configuration), or some combination of software, hardware, and/or firmware. It will be understood in light of this disclosure that the modules described herein represent one embodiment of the present invention. Certain embodiments may include other and/or different modules and functionality. In addition, the embodiments may lack modules described herein and/or distribute the described functionality among the modules in a different manner. In one embodiment, the modules are stored on a storage device of the corresponding device as executable files, loaded into local memory, and executed by a local processor as one or more processes.

Endpoint Compliance Module

Figure 2:
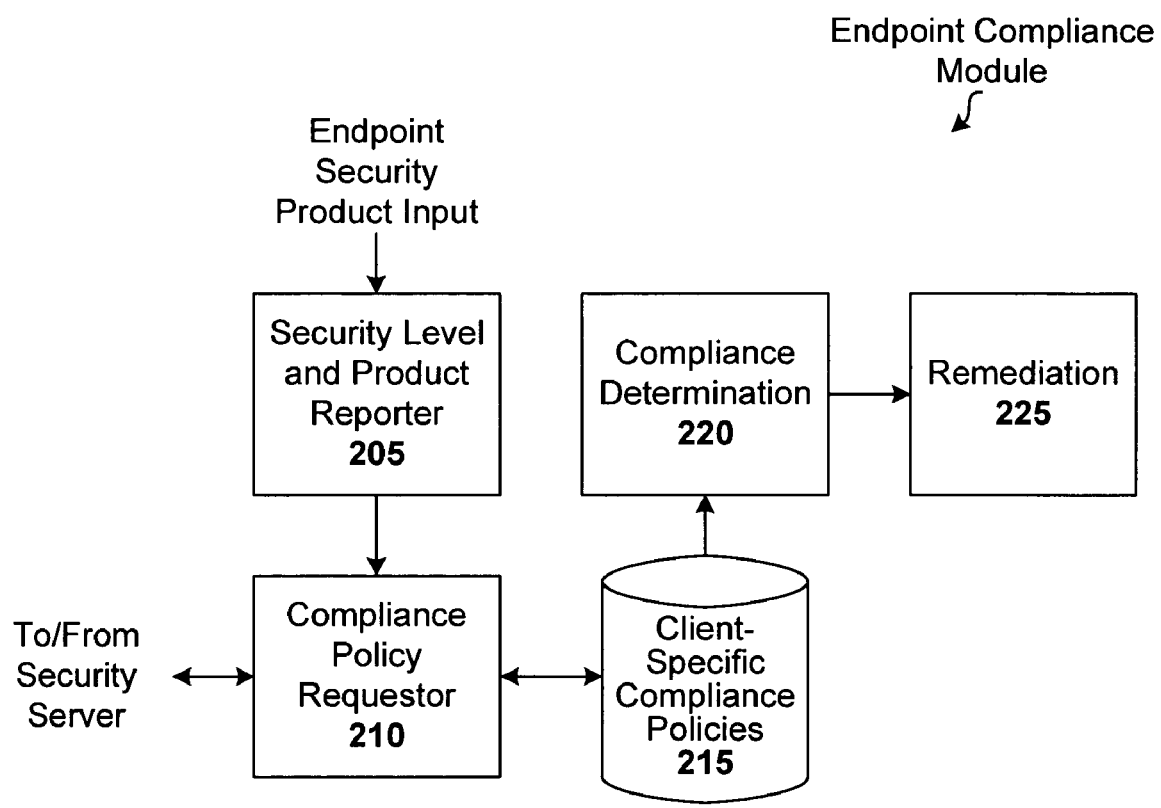
FIG. 2 is a block diagram of an endpoint compliance module configured in accordance with an embodiment of the present invention.

FIG. 2 is a block diagram of an endpoint compliance module configured in accordance with an embodiment of the present invention. This module can be implemented as any of the endpoint compliance modules 125a, 130a, and 135a of FIG. 1. As can be seen, the endpoint compliance module includes a security level and product reporter module 205, a compliance policy requestor module 210, client-specific compliance policies module 215, a compliance determination module 220, and a remediation module 225.

Each of these modules can be implemented, for example, with software (e.g., C, C++), hardware (e.g., gate-level logic), firmware (e.g., embedded routines executing on one or more microcontrollers of the host device), or some combination thereof. Note that other embodiments may be configured differently than the one shown. For instance, another embodiment only includes the functionality of the security level and product reporter module 205 and the compliance policy requestor module 210. In such one such embodiment, the functionality of modules 205 and 210 can be implemented separately as shown, or in a single module. Further, the client-specific compliance policies 215 can be stored within that single module, or in a separate database that is accessible to the module or modules. Many variations of the endpoint compliance module will be apparent in light of this disclosure.

The security level and product reporter module 205 allows the customer (e.g., network administrator or other customer personnel) to input information relevant to the endpoint compliance security scheme, including the various security products deployed by the customer on that particular host system or network, and the desired security level for each of those products. The module 205 can be programmed or otherwise configured with a user interface (UI) to facilitate this input process. The UI may include, for instance, a number of pull-down menus including the most commonly used products for which policies can be provided, as well as corresponding pull-down menus including security levels (e.g., not applicable, low, medium-low, medium, and high) that can be assigned to those various products. Alternatively, the customer can manually enter such information. Alternatively, module 205 can be programmed or otherwise configured to scan the host device for products for which policies can be provided, and then either assign some default security levels, recommend security levels, and/or allow the customer to specify the security levels for the identified products. Note that such scanning can be carried out remotely (e.g., by server 105 of the security service) as well. Various UI and/or data harvesting techniques can be used to collect or otherwise set the product and security levels for each host device of the customer network, as will be apparent in light of this disclosure.

The compliance policy requestor module 210 is programmed or otherwise configured to communicate with the security service (e.g., via network 120). For instance, module 210 can be configured to request endpoint compliance policies and to periodically upload the products and security levels (which can be set using module 205 as previously discussed) to the security server 105 of the security service. In one embodiment, this product and security level information is uploaded each time the host system requests endpoint compliance policies from the service (e.g., for first time requests or update requests). Alternatively, this product and security level information can be uploaded each time the customer modifies (e.g., adds, deletes, or otherwise updates) the information. A request for updated policies can be made periodically (e.g., every 8 hours or once a day at midnight) and/or any time changes are made to the customer's environment (e.g., removal/addition of new clients/appliances, replacement of existing clients/appliances, and/or updates to software or configuration of existing clients/appliances).

In any case, communicating product and security level information to the service allows the service to generate policy that is appropriate for the customer's environment. For example, if a customer has deployed ZoneAlarm to all clients, policy will be generated specifically for ZoneAlarm. If a customer has not deployed a client firewall at all, then the security service might provide only lower security policies (perhaps taking the opportunity to deliver recommendations on products that would improve the customer's client security). The custom-tailored policies received from the service (e.g., via module 210) can then be stored in the client-specific compliance policies module 215. Thus, the customer can configure the enforcement points (e.g., firewall, wireless access point, etc) to enforce appropriate traffic controls if compliance to one of these policies is not met. Beneficially, the customer does not have to configure the endpoint compliance policy. As new products, versions, signatures, system patches, etc are deployed, and as new threats are introduced in the wild, the security service generates new compliance policies to address these changes. The customer is then assured that the various endpoint policies being enforced are always current and in concert with intended use.

In the embodiment shown, the compliance determination module 220 can access the custom-tailored endpoint compliance policies stored in the client-specific compliance policies module 215, and determine if the host is compliant. This determination can be carried out using conventional or custom compliance determination techniques. If non-compliance if found, then remediation module 225 is configured to effect remedial processing, such as to request the downloading of current malware signatures, components, and/or security patches. Likewise, and as previously explained, the remedial processing may including temporarily assigning the non-compliant host to a restricted network until compliance is achieved. Numerous remedial schemes can be employed.

Methodology

Figure 3:
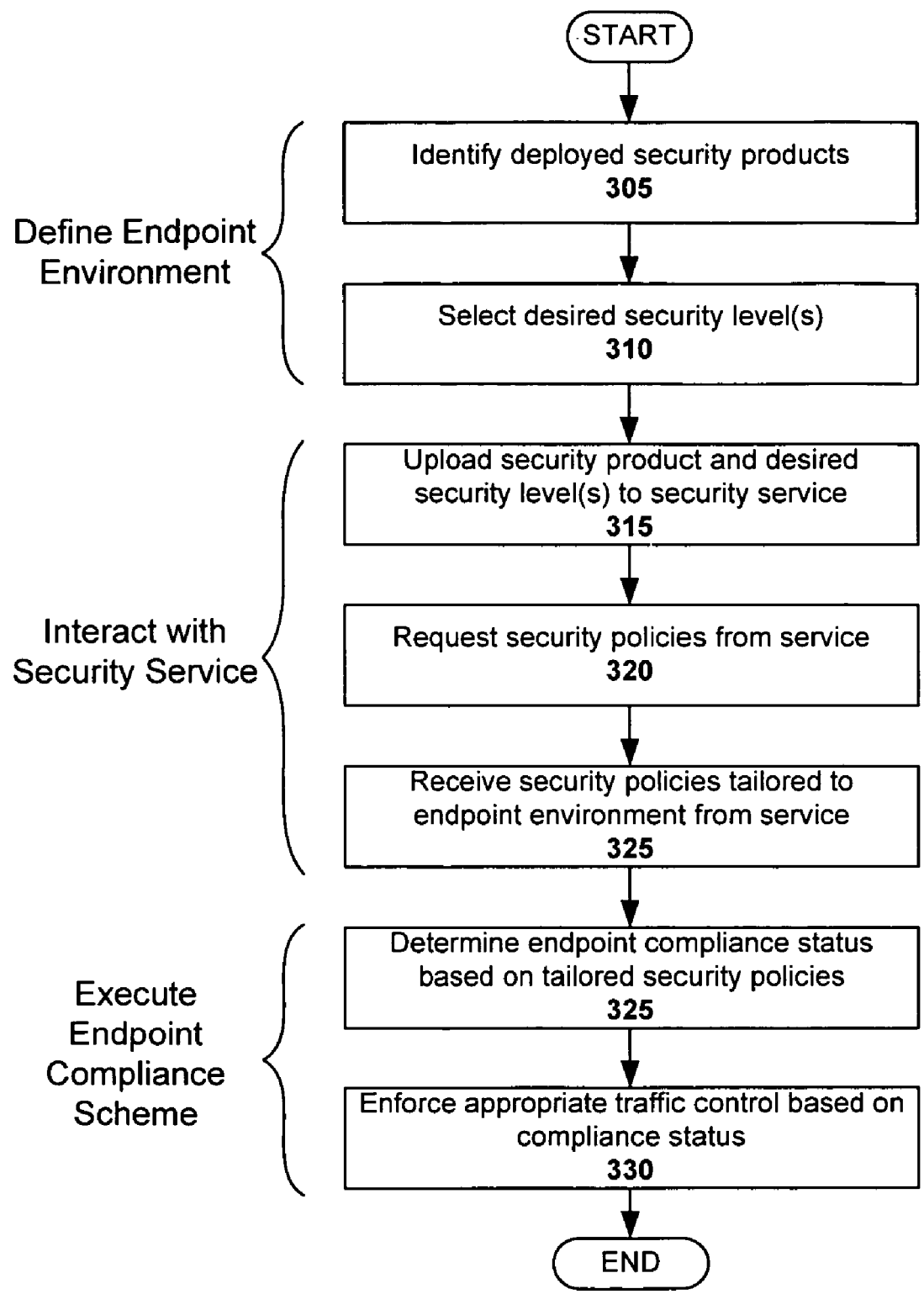
FIG. 3 illustrates a method for automated endpoint compliance policy configuration in accordance with an embodiment of the present invention.

FIG. 3 illustrates a method for automated endpoint compliance policy configuration in accordance with an embodiment of the present invention. This method can be carried out, for example, by any one of the endpoint compliance modules 125a, 130a, and 135a as described with reference to FIGS. 1 and 2. As previously explained, these modules can be implemented, for example, as executable code encoded on a machine-readable medium.

The method begins with defining an endpoint environment of the customer, which includes identifying 305 deployed security products and selecting 310 the desired security levels, as previously explained. The method continues with interacting with the security service, which includes uploading 315 the security product and desired security levels to security service, requesting 320 security policies from the service, and receiving 325 security policies tailored to the endpoint environment from the service. As previously explained, the uploading 315 and requesting 320 can be carried out contemporaneously, but need not be. The customer now has access to custom-tailored endpoint compliance policies.

The method of this embodiment continues with determining 325 endpoint compliance status based on the custom-tailored security policies, and enforcing 330 appropriate traffic control based on the compliance status, as previously explained. Numerous conventional or custom compliance determination and enforcement schemes can be employed.

Figure 4:
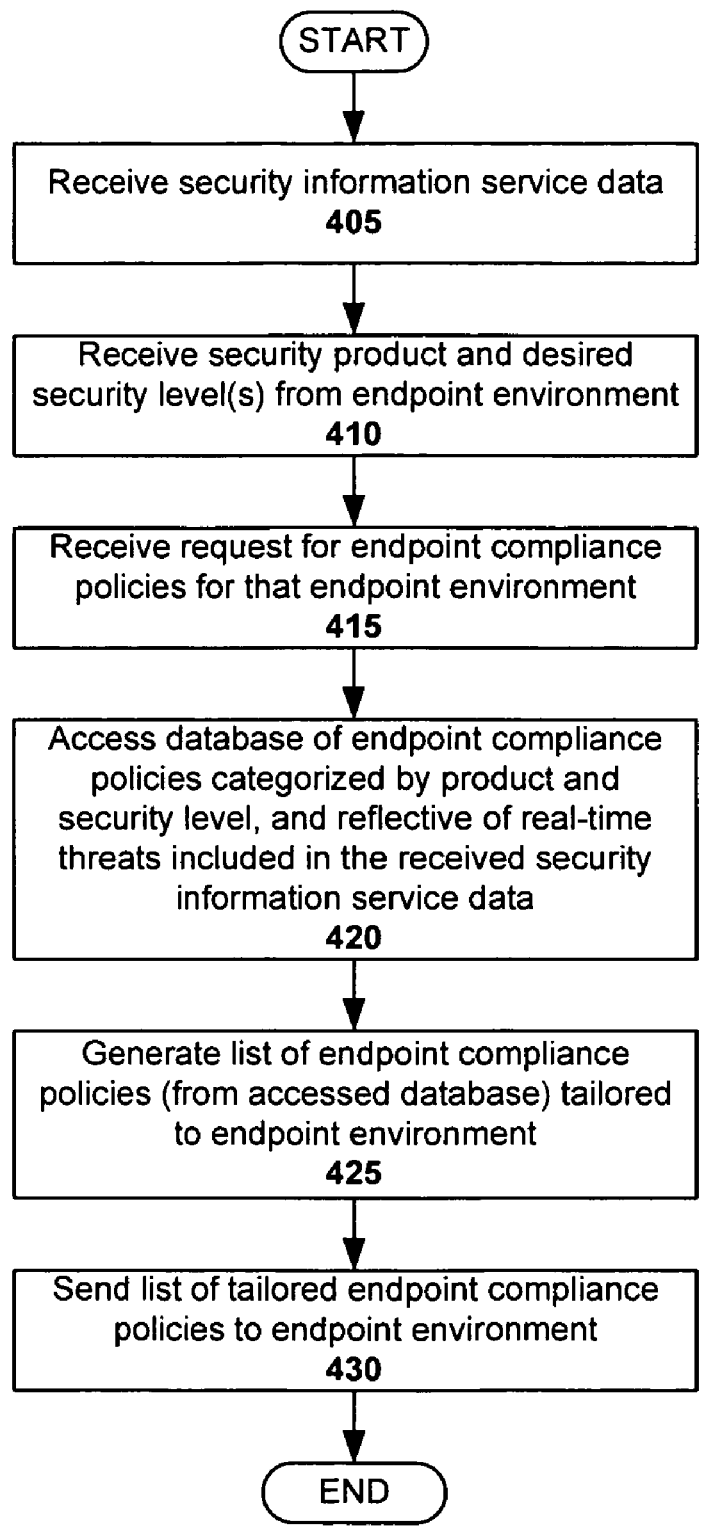
FIG. 4 illustrates a method for automated endpoint compliance policy configuration in accordance with another embodiment of the present invention.

FIG. 4 illustrates a method for automated endpoint compliance policy configuration in accordance with another embodiment of the present invention. This method can be carried out, for example, by the security service as described with reference to FIG. 1. As previously explained, modules configured for carrying out functionality of the security service can be implemented, for example, as executable code encoded on a machine-readable medium.

The method begins with receiving 405 security information service data, such as security alert data received from Symantec DeepSight Alert Service and other such early warning services that deliver timely and actionable security alerts. The method further includes receiving 410 security product and desired security levels from an endpoint environment of a subscribing customer, and receiving 415 a request for endpoint compliance policies for that endpoint environment. As previously explained, receiving 410 the security product and desired security levels may occur contemporaneously with receiving 415 the request, but non-contemporaneous receiving can also be acceptable. For instance, as long as the current security product and desired security levels for an endpoint environment are known, requests for endpoint compliance policies for that endpoint environment can be received at any time.

The method continues with accessing 420 a database of endpoint compliance policies categorized by product and security level. Note that the endpoint compliance policies in the database reflect the real-time threat data obtained from one or more security information services (received in step 405). The method continues with generating 425 a list of endpoint compliance policies tailored to the endpoint environment. The accessed database from which the list of custom-tailored endpoint compliance policies is generated can be any facility capable of being searched to identify endpoint compliance policies that match the specified products and security levels of the customer. The method continues with sending 430 the list of endpoint compliance policies to the endpoint environment.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method for automated endpoint compliance policy configuration, comprising:
    using a computer processor configured to execute method steps comprising:
        receiving, from an endpoint environment of a customer, data regarding a plurality of products deployed in the endpoint environment and a desired security level corresponding to each of the products;
        receiving a request for endpoint compliance policies for the endpoint environment;
        receiving alert data indicative of one or more current security alerts from an early warning security alert service;
        generating one or more endpoint compliance policies custom-tailored to a current state of network security of the endpoint environment, wherein each of the one or more endpoint compliance policies comprises a rule applicable at the desired security level for the corresponding product, the rule of at least one of the endpoint compliance policies requiring an action based on the alert data; and
        sending the one or more custom-tailored endpoint compliance policies to the endpoint environment.

2. The method of claim 1 wherein generating one or more endpoint compliance policies custom-tailored to the endpoint environment further comprises:
    accessing a database of endpoint compliance policies categorized by security products and security levels corresponding to each of the security products, the database comprising different endpoint compliance policies for different security levels corresponding to one of the security products; and
    retrieving compliance policies corresponding to the received security levels.

3. The method of claim 1 wherein each of the steps is carried out at a location remote from the endpoint environment, the method further comprising at the endpoint environment:
    uploading the data regarding the plurality of desired security levels to the remote location;
    requesting endpoint compliance policies from the remote location; and
    receiving the endpoint compliance policies custom-tailored to the endpoint environment from the remote location.

4. The method of claim 3 further comprising at the endpoint environment at least one of:
    determining endpoint compliance status based on the endpoint compliance policies custom-tailored to the endpoint environment; and
    enforcing appropriate traffic control based on compliance status.

5. A machine-readable medium encoded with instructions, that when executed by a processor, cause the processor to carry out a process for automated endpoint compliance policy configuration, the process comprising:
    receiving, from an endpoint environment of a customer, data regarding a plurality of products deployed in the endpoint environment and a desired security level corresponding to each of the products;
    receiving a request for endpoint compliance policies for the endpoint environment;
    receiving alert data indicative of one or more current security alerts from an early warning security alert service;
    generating one or more endpoint compliance policies custom-tailored to a current state of network security of the endpoint environment, wherein each of the one or more endpoint compliance policies comprises a rule applicable at the desired security level to for the corresponding products, the rule of at least one of the endpoint compliance policies requiring an action based on the alert data; and
    sending the one or more custom-tailored endpoint compliance policies to the endpoint environment.

6. The machine-readable medium of claim 5 wherein generating one or more endpoint compliance policies custom-tailored to the endpoint environment further comprises:
    accessing a database of endpoint compliance policies categorized by security products and security levels corresponding to each of the security products, the database comprising different endpoint compliance policies for different security levels corresponding to one of the security products; and
    retrieving compliance policies corresponding to the received security levels.

7. The machine-readable medium of claim 5 wherein the plurality of security products and the desired security level corresponding to each are at least one of provided by the customer and determined automatically by scanning the endpoint environment for products for which policies can be provided, and then at least one of assigning default security levels, recommending security levels, and allowing the customer to specify the security levels for the identified products.

8. A system for automated endpoint compliance policy configuration, comprising:
    a server for receiving, from an endpoint environment of a customer, data regarding a plurality of products deployed in the endpoint environment and a desired security level corresponding to each of the products, and receiving a request for endpoint compliance policies for the endpoint environment; and
    a customized endpoint compliance policy generator for receiving alert data indicative of one or more current security alerts from an early warning security alert service, and for generating one or more endpoint compliance policies custom-tailored to a current state of network security of the endpoint environment, wherein each of the one or more endpoint compliance policies comprises a rule applicable at the desired security level for the corresponding products, the rule of at least one of the endpoint compliance policies requiring an action based on the alert data;

wherein the server is further configured for sending the one or more custom-tailored endpoint compliance policies to the endpoint environment.

9. The system of claim 8 wherein the customized endpoint compliance policy generator generates the one or more endpoint compliance policies custom-tailored to the endpoint environment by accessing a database of endpoint compliance policies categorized by security products and security levels corresponding to each of the security products, the database comprising different endpoint compliance policies for different security levels corresponding to one of the security products; and retrieving compliance policies corresponding to the received security levels.

10. The system of claim 8 wherein the plurality of security products and the desired security level corresponding to each are at least one of provided by a customer and determined automatically by scanning the endpoint environment for products for which policies can be provided, and then at least one of assigning default security levels, recommending security levels, and allowing the customer to specify the security levels for the identified products.

11. The system of claim 8 further comprising at the endpoint environment:

a security level and product reporter module for obtaining the desired security levels corresponding to each of the security products in the endpoint environment; and a compliance policy requestor module for uploading the data regarding the plurality of desired security levels to the server, requesting endpoint compliance policies from the server, and receiving endpoint compliance policies custom-tailored to the endpoint environment from the server.

12. The system of claim 11 further comprising at the endpoint environment at least one of:

a compliance determination module for determining endpoint compliance status based on the endpoint compliance policies custom-tailored to the endpoint environment; and a remediation module for enforcing appropriate traffic control based on compliance status.

13. A system for automated endpoint compliance policy configuration, comprising:

a means for receiving, from an endpoint environment of a customer, data regarding a plurality of products deployed in the endpoint environment and a desired security level corresponding to each of the products;

a means for receiving a request for endpoint compliance policies for the endpoint environment;

a means for receiving alert data indicative of one or more current security alerts from an early warning security alert service;

a means for generating one or more endpoint compliance policies custom-tailored to a current state of network security of the endpoint environment, wherein each of the one or more endpoint compliance policies comprises a rule applicable at the desired security level for the corresponding products, the rule of at least one of the endpoint compliance policies requiring an action based on the alert data; and a means for sending the one or more custom-tailored endpoint compliance policies to the endpoint environment.

14. The system of claim 13 further comprising at the endpoint environment:

a means for obtaining the desired security levels corresponding to each of the security products in the endpoint environment;

a means for uploading the data regarding the plurality of desired security levels to the means for receiving the plurality of desired security level data;

a means for requesting endpoint compliance policies; and a means for receiving endpoint compliance policies custom-tailored to the endpoint environment.

15. The method of claim 1 wherein generating one or more endpoint compliance policies further comprises generating a plurality of different policies for different products deployed in the endpoint environment.

\* \* \* \* \*